(12) United States Patent
Stahmer et al.

(10) Patent No.: US 6,908,135 B2
(45) Date of Patent: Jun. 21, 2005

(54) MOTOR VEHICLE WITH HOLDING DEVICES

(75) Inventors: Michael Stahmer, Munich (DE); Ralf Langmeier, Munich (DE); Benedikt Mueller, Rosenheim (DE); Juergen Steinle, Augsburg (DE); Juergen Dippold, Grafing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/668,275

(22) Filed: Sep. 24, 2003

(65) Prior Publication Data

US 2004/0145205 A1 Jul. 29, 2004

(30) Foreign Application Priority Data

Sep. 25, 2002 (DE) .......................................... 102 44 520

(51) Int. Cl.[7] ................................................ B60R 7/08
(52) U.S. Cl. ...................................... 296/37.8; 296/1.07
(58) Field of Search .......................... 296/24.34, 24.46, 296/37.1, 37.8, 37.12, 37.14, 1.07

(56) References Cited

U.S. PATENT DOCUMENTS

| | | | | |
|---|---|---|---|---|
| 3,632,158 A | * | 1/1972 | Boothe ....................... 296/37.8 |
| 4,842,174 A | * | 6/1989 | Sheppard et al. ........... 224/548 |
| 4,846,382 A | * | 7/1989 | Foultner et al. ............. 224/483 |
| 4,854,538 A | * | 8/1989 | Von Schalscha ........ 248/346.03 |
| 5,085,481 A | * | 2/1992 | Fluharty et al. ............ 296/37.8 |
| 5,660,311 A | * | 8/1997 | Soltau ......................... 224/483 |
| 6,062,518 A | * | 5/2000 | Etue ........................ 248/231.21 |
| 6,158,793 A | * | 12/2000 | Castro ........................ 296/1.07 |
| 6,338,517 B1 | * | 1/2002 | Canni et al. ................ 296/37.8 |
| 6,394,526 B1 | * | 5/2002 | Gyllenspetz .................. 296/70 |
| 6,497,443 B2 | * | 12/2002 | Worrell et al. .............. 296/37.8 |
| 6,601,798 B2 | * | 8/2003 | Cawley .................... 244/118.6 |
| 6,634,692 B1 | * | 10/2003 | Barat et al. .................... 296/70 |
| 6,692,053 B1 | * | 2/2004 | Smith ......................... 296/37.1 |
| 6,709,041 B1 | * | 3/2004 | Hotary et al. ................. 296/70 |
| 6,749,244 B1 | * | 6/2004 | Song .......................... 296/37.7 |
| 2003/0122392 A1 | * | 7/2003 | Larsen et al. ............... 296/24.1 |
| 2004/0084920 A1 | * | 5/2004 | Trimble et al. ............. 296/37.8 |

FOREIGN PATENT DOCUMENTS

| | | | |
|---|---|---|---|
| DE | 4340980 | 6/1994 | |
| DE | 9409337 | 9/1994 | |
| DE | 19746197 | 4/1999 | |
| DE | 10063190 | 6/2002 | |
| WO | WO 00/66387 A1 | * 11/2000 | ........... B60K/37/02 |

* cited by examiner

*Primary Examiner*—Patricia L. Engle
(74) *Attorney, Agent, or Firm*—Crowell & Moring, LLP

(57) ABSTRACT

A motor vehicle in which keeping and holding objects is facilitated. At least one multifunctional holder is placed or attached in the motor vehicle and at least one device, on which at least one additional function can be mounted detachably, is placed or attached over the individual multifunctional holder.

19 Claims, 5 Drawing Sheets

MOTOR VEHICLE WITH HOLDING DEVICES

BACKGROUND AND SUMMARY OF THE INVENTION

This application claims the priority of German Patent Document No. DE 102 44 520.6 filed Sep. 25, 2002, the disclosure of which is expressly incorporated by reference herein.

There are already some motor vehicles that provide shelves for storage or devices for holding an object such as, for example, a beverage cup or a phone or the like, at the dashboard or center console.

It is the task of the invention to develop a motor vehicle in which storing and holding objects is facilitated.

The motor vehicle according to the invention is equipped with a multifunctional holder that is placed at or attached to the dashboard, center console, side molding and/or any other suitable place in the vehicle. Such mounting places are not limited to the inside of the vehicle. In an advantageous way, multifunctional holders can also be provided in the trunk and/or engine compartment.

The multifunctional holder according to the invention serves as a retaining device for additional components or additional equipment of the motor vehicle. Using a single multifunctional holder for various accessories with different functions provides many application possibilities. Furthermore, the multifunctional holder according to the invention and the corresponding accessories allows for individual design of the interior fittings. Due to their small size, it is easy to deposit the accessories in the holding areas provided in the vehicle, such as the glove compartment or places of deposit in the door moldings or in the center console.

In an advantageous way, accessories according to the invention are a mounting device for a container, such as a beverage cup or the like, or a retaining device for additional units with an electrical connection, such as, for example, a phone, laptop, palmtop, additional lights and/or flashlights.

Other accessories according to the invention are places for depositing items in daily use such as, for example, a case for glasses, glasses, pens, coins, garage door opener, cigarettes, phone cards, and maps. Accessories according to the invention can also be holding devices for audio equipment such as CDs, music tapes or the like, and/or devices for collecting garbage and/or support for a purse or the like.

In an advantageous manner, the multifunctional holder according to the invention is integrated either openly at an outer surface or concealed as an insert, for example, in the form of a locking opening at a suitable place, for example in the dashboard, center console and/or side molding or the like.

Other objects, advantages and novel features of the present invention will become apparent from the following detailed description of the invention when considered in conjunction with the accompanying drawings.

BRIEF DESCRIPTION OF THE DRAWINGS

Various embodiments of the invention are described below with the aid of the drawings by way of example, in which.

DETAILED DESCRIPTION OF THE DRAWINGS

Figure 1:
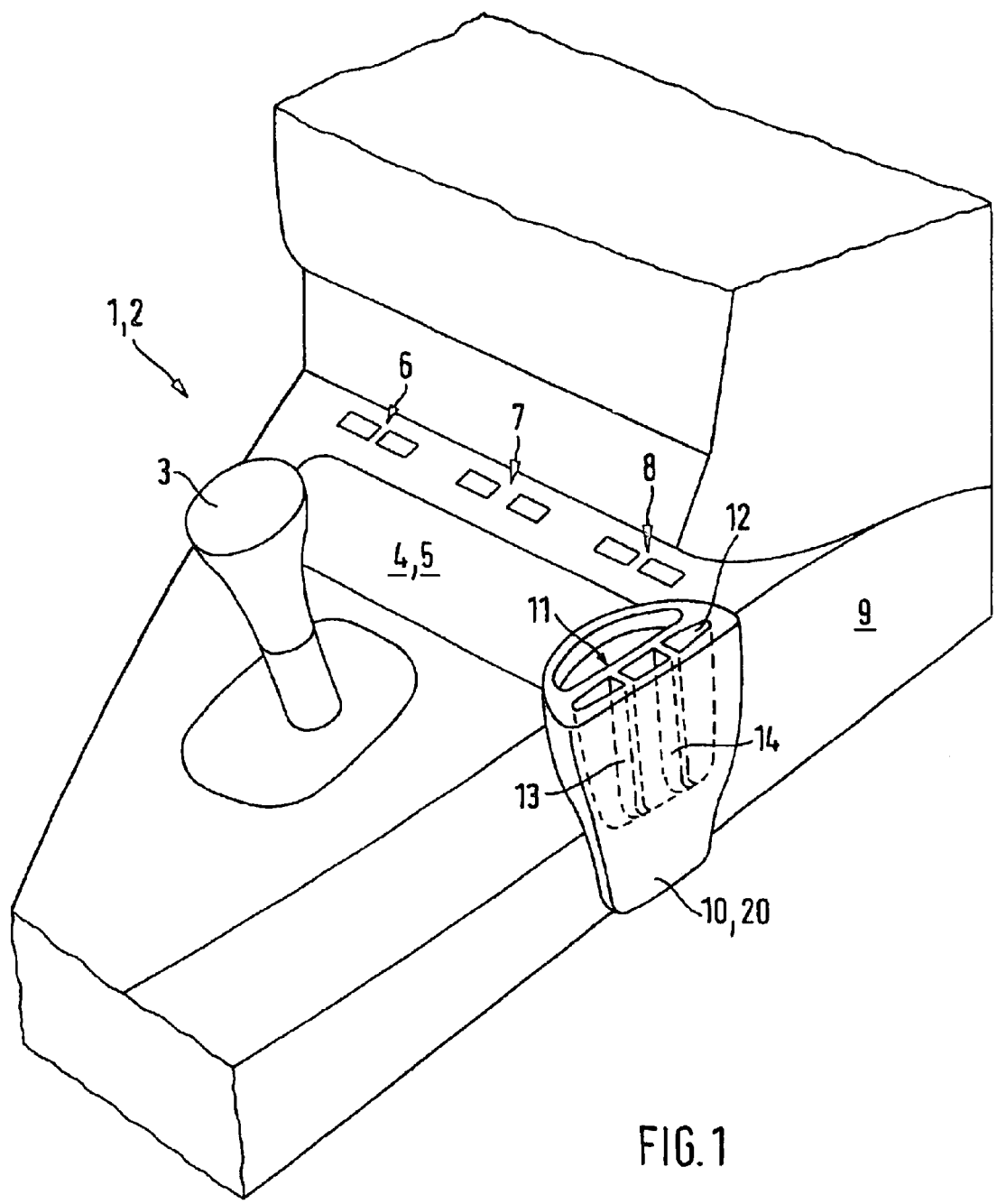
FIG. 1 shows a perspective view of a partially represented center console where a holding device for pens or the like has been placed as an accessory on the lateral surface.

FIG. 1 shows a partially represented center console 2 of a motor vehicle 1, the rest of which is not shown. The center console 2, for example, features a gearshift lever 3, a place of deposit 5 with a cover 4, and switches 6, 7, and 8 for operating additional parts of the motor vehicle 1. On the lateral wall 9 of the center console 2, an accessory 10 is attached, above a mounting section 20, to a carrier element or multifunctional holder 15 shown in FIG. 2.

The accessory 10 shown in FIG. 1, for example, serves to retain writing instruments. For that reason, the accessory 10 features a place of deposit 11 open on top and an interior space 13, lockable with a lid 12, that is divided by internal partitions 14 for example.

Figure 2:
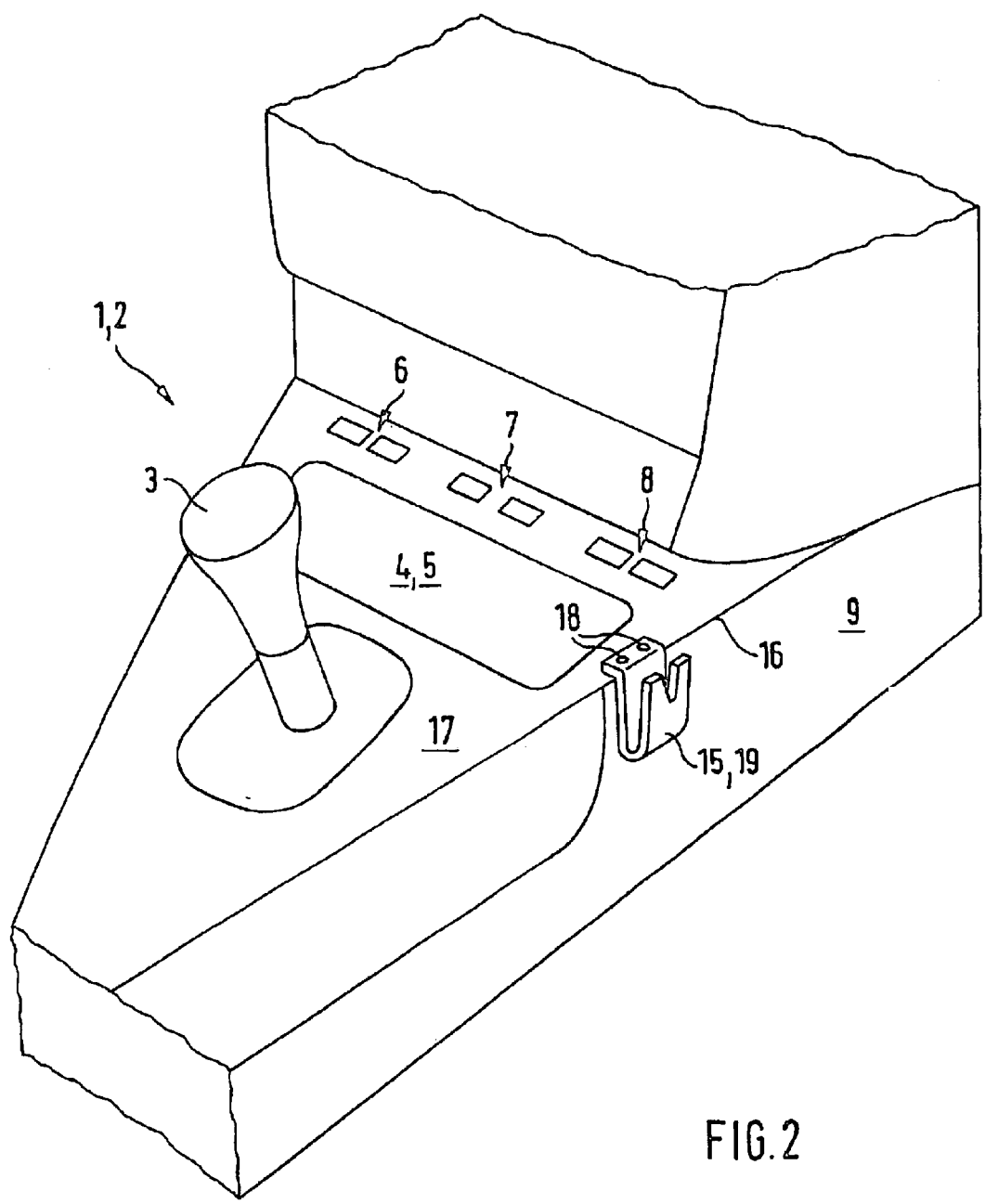
FIG. 2 shows a perspective view of the center console shown in FIG. 1 with a multifunctional holder for retaining, for example, the top part shown in FIG. 1.

FIG. 2 corresponds to FIG. 1 except for the difference that the accessory 10 has been removed so that in FIG. 2 the carrier element or multifunctional holder 15 is now visible. In a form-fitting and/or force-fitting way, the multifunctional holder 15 is attached on the lateral wall 9 or to the edge 16 of the center console 2 or to the surface 17 that runs more or less horizontally of the center console 2 by using appropriate fasteners 18. In the embodiment shown, the multifunctional holder 15 features a hook-type mounting section 19 that engages with the corresponding mounting section 20 of the accessory 10 shown in FIG. 3.

Figure 3:
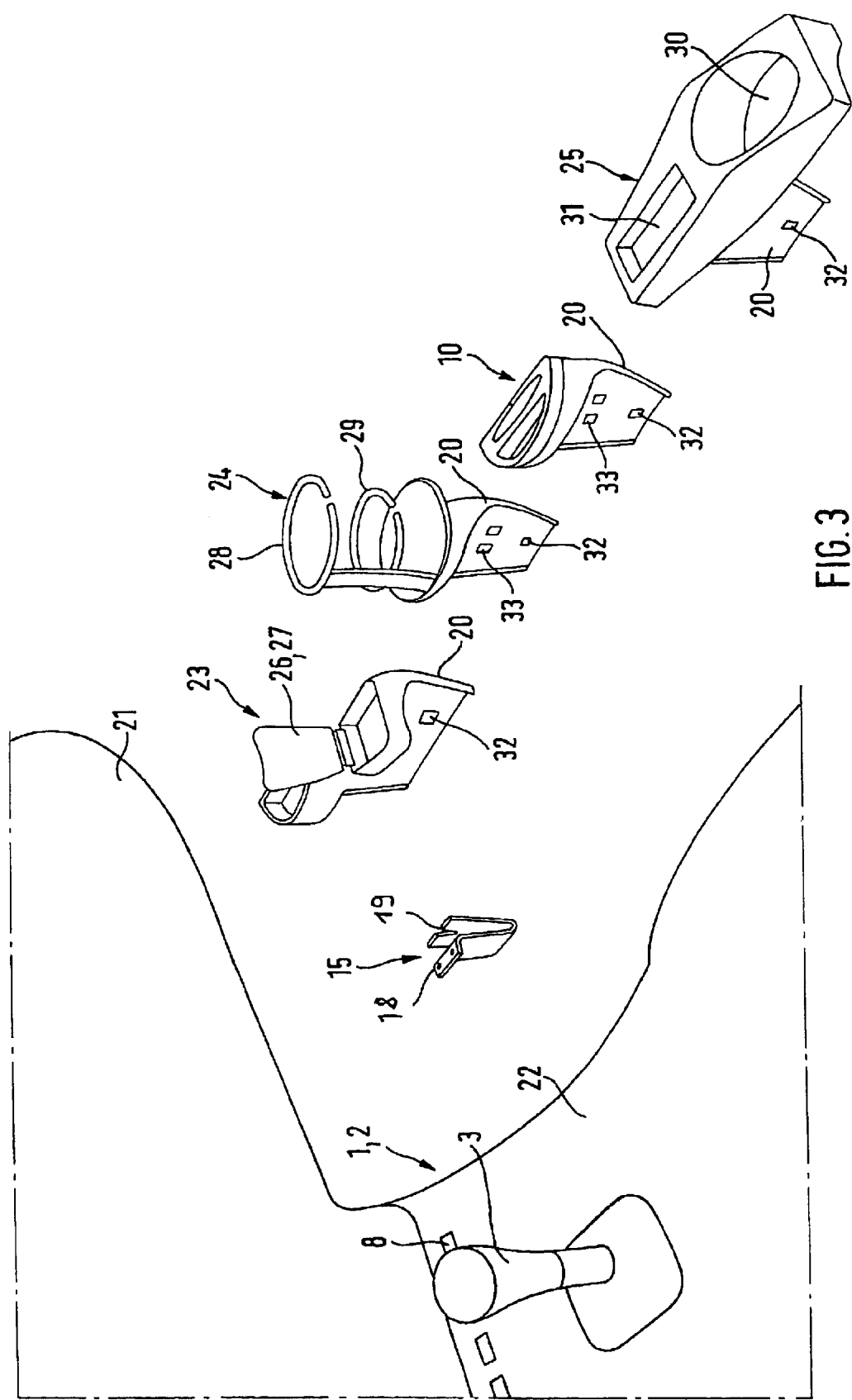
FIG. 3 shows an exploded view of a multifunctional holder with four possible accessories prior to being attached to a partially shown dashboard and a center console connected to it.

In FIG. 3, next to the center console 2, a section of a dashboard 21 is visible. The multifunctional holder 15 is not yet attached to an outer surface 22 of the center console 2 in the exploded view of FIG. 3. In addition to the accessory 10 shown in FIG. 1, three additional tops 23, 24, and 25 can be seen in FIG. 3. Top 23, for example, is equipped with an electronic component 26 that features, for example, a monitor or a display 27. Such a component 26 could be, for example, a laptop, palmtop, board computer or the like.

The top 24 is an embodiment of a holder for beverage containers that features, for example, two rings 28, 29 for retaining a cup not shown. The top 25 is another embodiment of a holder for beverage containers and features a corresponding indentation 30. In addition, the top 25 is equipped with a space for storage 31.

In the embodiment shown, the mounting section 20 of the accessory 10 or of the tops 23, 24, and 25 provides indentations 32 or hooks 33 or the like that engage with the mounting section 19 of the multifunctional holder 15.

Figure 4:
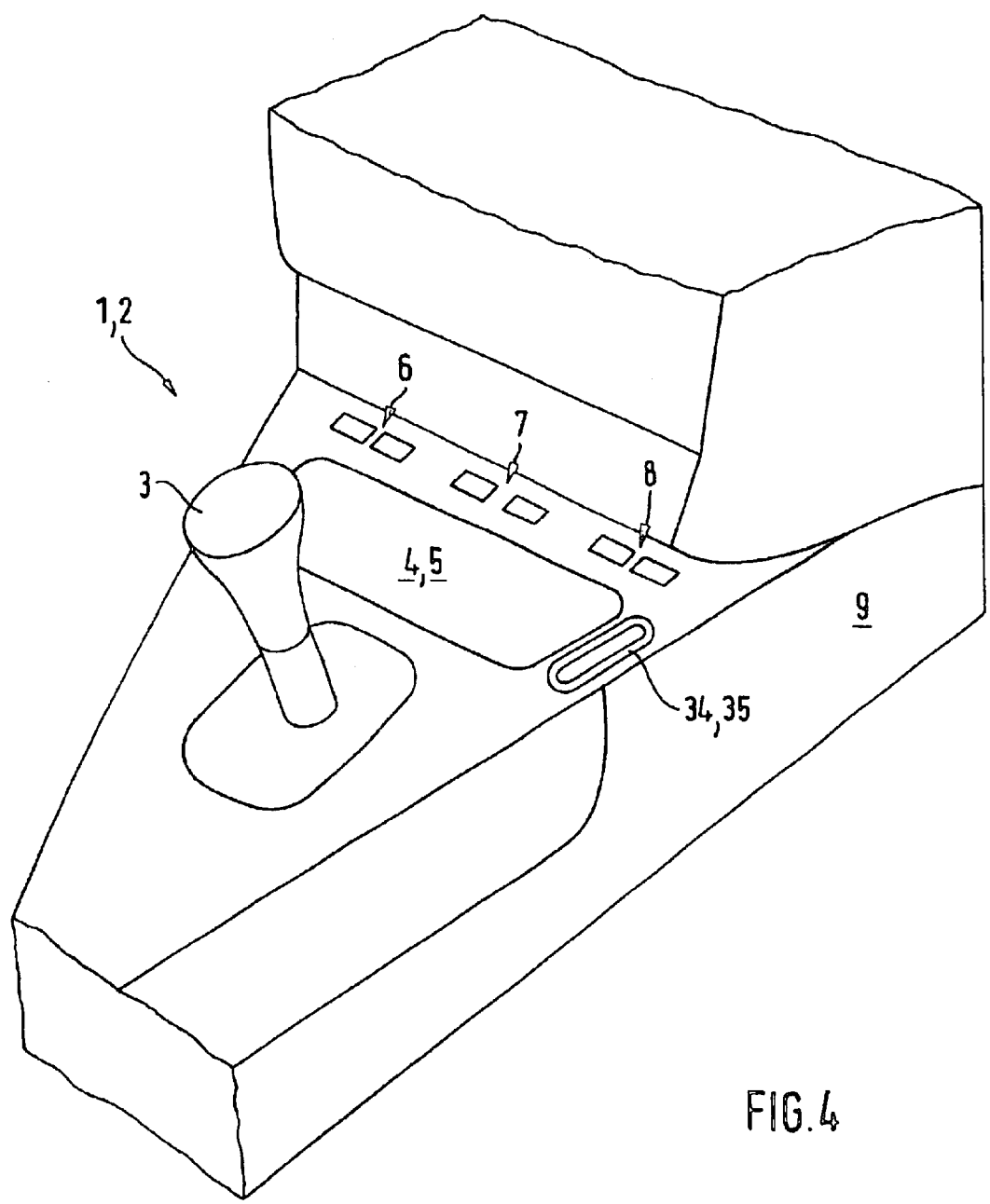
FIG. 4 shows a perspective view of a center console with another embodiment of a multifunctional holder that is integrated in the center console as an insert.

FIG. 4 shows another embodiment of a multifunctional holder 34 that is integrated as an insert into a hollow space of the center console 2. In this case, the multifunctional holder 34 is locked with a lid 35. A mechanism is placed onto the lid 35 which allows the lid 35 to be moved and/or swung horizontally by the individual mounting section 20 of the accessory 10 or the tops 23, 24, and 25 when pressure is applied.

Figure 5:
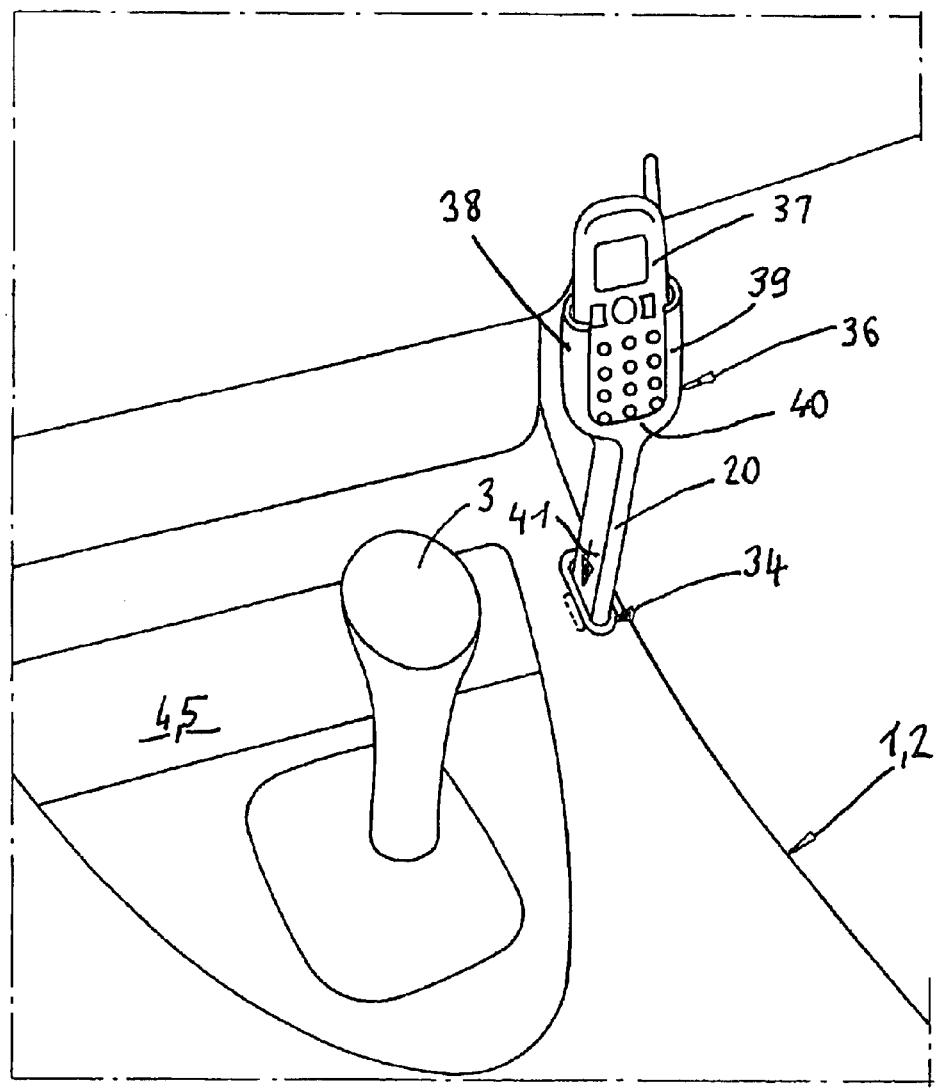
FIG. 5 shows a perspective view of a retaining device placed into the multifunctional holder of FIG. 4 for an additional unit that could be a mobile phone, for example.

In FIG. 5, a retaining device 36 is placed into the multifunctional holder 34. In one embodiment, the retaining device 36 features electrical connections which, on the one hand, are attached to the mounting section 20 and can be brought into electrical contact with the existing connections in the motor vehicle 1, and, on the other hand, can be joined with connections that exist in a component 37 placed in the retaining device 36.

In the embodiment shown in FIG. 5, the component 37 is a mobile phone or cell phone. To hold the component 37, for example, the retaining device 36 features two arms 38 and 39 distant from each other. The electrical connections for the component 37 can be provided in a section 40 that links the arms 38 and 39. An arrow 41 indicates the direction in which the retaining device 36 is inserted during installation.

Through the electrical connection that exists in the motor vehicle 1, the accessories can be equipped with a feature for heating and/or cooling so that it is possible to warm up or heat and/or cool liquid and/or solid food.

The multifunctional holders 15 and 34 can be placed at any possible and suitable place in the interior space of the vehicle or in the trunk or engine compartment so that the accessories or tops 10, 23, 24, 25, and 36 that are required in those places can be used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle with devices for holding objects and accessories, comprising:
    at least one multifunctional holder placed in or attached to the motor vehicle; and
    a plurality of holding devices wherein each of the plurality of holding devices has a physical structure different from each of the other of the plurality of holding devices for holding an item that is functionally different from an item held in each of the other of the plurality of holding devices and wherein each of the plurality of holding devices is interchangeably attachable to the at least one multifunctional holder, and further wherein each of the plurality of holding devices is attachable to the at least one multifunctional holder at a same set of attachment points that define the points of attachment between a one of the plurality of holding devices and the multifunctional holder.

2. The motor vehicle according to claim 1, wherein the multifunctional holder is placed in an interior space of one of the motor vehicle, an engine compartment, and a trunk.

3. The motor vehicle according to claim 1, wherein the multifunctional holder is provided in an interior space of the motor vehicle at one of a center console, a dashboard, a side molding of a door or lateral wall, and a back of a seat and wherein the multifunctional holder is concealed as an insert in a hollow space or openly visible at an outer surface.

4. The motor vehicle according to claim 1, wherein at least one of the plurality of holding devices is a holder for at least one of a container, a case for glasses, glasses, writing utensils, coins, and cigarettes.

5. The motor vehicle according to claim 1, wherein at least one of the plurality of holding devices includes at least one electrical connection for electrically operated equipment that is held by the at least one device.

6. The motor vehicle according to claim 5, wherein the electrically operated equipment is one of a laptop, palmtop, recording system, reproducing system, mobile phone, and reading lamp.

7. The motor vehicle according to claim 1, wherein audio equipment, an ashtray, or a garbage container is held in at least one of the plurality of holding devices.

8. A motor vehicle holding device, comprising:
    a multifunctional holder associated with an interior of the motor vehicle; and
    a plurality of holding devices, wherein each of said plurality of holding devices has a physical structure different from each of the other of the plurality of holding devices for holding an item that is functionally different from an item held in each of the other of the plurality of holding devices and wherein each of the plurality of holding devices is interchangeably attachable to the multifunctional holder at a same set of attachment points that define the points of attachment between a one of the plurality of holding devices and the multifunctional holder.

9. The motor vehicle holding device of claim 8, wherein the multifunctional holder is attached to an exterior surface of the interior of the motor vehicle.

10. The motor vehicle holding device of claim 8, wherein the multifunctional holder is integrated within a structure in the interior of the motor vehicle.

11. The motor vehicle holding device of claim 8, wherein each of the plurality of holding devices includes a mounting section that is detachably connectable to the multifunctional holder.

12. The motor vehicle holding device of claim 11, wherein the mounting sections are detachably connectable to an exterior surface of the multifunctional holder.

13. The motor vehicle holding device of claim 11, wherein the mounting sections are detachably connectable within an interior of the multifunctional holder.

14. A method for holding a device in a motor vehicle, comprising the steps of:
    placing a multifunctional holder within an interior of the motor vehicle;
    attaching one of a plurality of holding devices to the multifunctional holder at a set of attachment points that define the points of attachment between the one of the plurality of holding devices and the multifunctional holder, wherein each of the plurality of holding devices is configured to hold a device with a function that is different from each other device;
    placing a respective device with a function into the one of the plurality holding devices attached to the multifunctional holder;
    detaching the one of the plurality of holding devices from the multifunctional holder;
    attaching a second of the plurality of holding devices to the multifunctional holder at the set of attachment points; and
    placing a second respective device with a second function into the second of the plurality of holding devices.

15. The method of claim 14, wherein the step of attaching one of the plurality of holding devices to the multifunctional holder includes the step of inserting a mounting section of the one of the plurality of holding devices into the multifunctional holder.

16. The method of claim 14, wherein the step of attaching one of the plurality of holding devices to the multifunctional holder includes the step of mechanically connecting a mounting section of the one of the plurality of holding devices to the multifunctional holder.

17. The method of claim 14, further comprising the steps of electrically connecting the one of the plurality of holding devices to the multifunctional holder and electrically connecting the respective device to the one of the plurality of holding devices.

18. The method of claim 14, wherein the step of placing the multifunctional holder within the interior of the motor vehicle includes the step of attaching the multifunctional holder to an exterior surface of the interior of the motor vehicle.

19. The method of claim 14, wherein the step of placing the multifunctional holder within the interior of the motor vehicle includes the step of integrating the multifunctional holder within a structure in the interior of the motor vehicle.

\* \* \* \* \*